(12) United States Patent
Shen

(10) Patent No.: US 6,179,342 B1
(45) Date of Patent: Jan. 30, 2001

(54) BEND CONDUIT HAVING LOW PRESSURE LOSS COEFFICIENT

(76) Inventor: Hsin-Der Shen, 208 Min-Shen W. Rd., Taipei (TW)

( * ) Notice: Under 35 U.S.C. 154(b), the term of this patent shall be extended for 0 days.

(21) Appl. No.: 09/330,566

(22) Filed: Jun. 11, 1999

(51) Int. Cl.$^7$ .................................................. F16L 43/00
(52) U.S. Cl. ................ 285/179; 285/129.2; 285/133.11
(58) Field of Search ................................ 285/179, 179.1, 285/197.2, 183, 129.1, 129.2, FOR 135, FOR 136, 133.11

(56) References Cited

U.S. PATENT DOCUMENTS

| 836,320 | * | 11/1906 | Hanlon | 285/179 |
| 917,395 | * | 4/1909 | Wise | 285/179 |
| 977,740 | * | 12/1910 | Higgins | 285/179 |
| 1,989,608 | * | 1/1935 | Reed | 285/179 |
| 2,286,565 | * | 6/1942 | Norton | 285/179 |
| 2,879,848 | * | 3/1959 | Drummond | 285/179 |
| 5,054,819 | * | 10/1991 | Grunwald | 285/179 |

FOREIGN PATENT DOCUMENTS

| 598919 | * | 6/1934 | (DE) | 285/179 |
| 1102040 | * | 3/1961 | (DE) | 285/179 |
| 1120367 | * | 12/1961 | (DE) | 285/179 |
| 1123256 | * | 2/1962 | (DE) | 285/179 |
| 1146808 | * | 4/1963 | (DE) | 285/179 |
| 184082 | * | 8/1922 | (GB) | 285/179 |
| 601130 | * | 12/1959 | (IT) | 285/179 |
| 404362394 | * | 12/1992 | (JP) | 285/179 |
| 406109192 | * | 4/1994 | (JP) | 285/179 |
| 505850 | * | 3/1976 | (SU) | 285/179 |

* cited by examiner

Primary Examiner—Erik K. Nicholson

(57) ABSTRACT

A bend conduit having a low pressure loss coefficient is provided. The bend conduit includes a first end serving as an inlet of a fluid, a second end serving as an outlet of the fluid, and an intermediate section which is positioned between the first and second ends, which has inner and outer curved portions, and serves to guide the fluid to flow from the first end to the second end, is expanded in volume axially, outwardly oriented at the center of the bend conduit toward outer portion to be a ball-like shape, having a cut off corner with reference to the inlet flow at an inclined angle($\alpha$) of 40 to 50 degree in inner curved portion, and cross sectional area ratio between the middle of intermediate section and first end section is larger than 1.2.

7 Claims, 4 Drawing Sheets

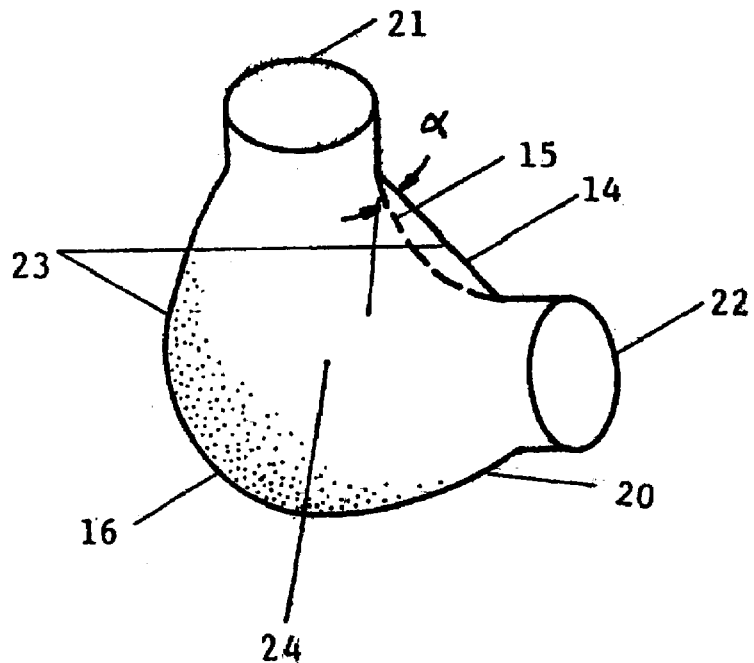
F I G . 3
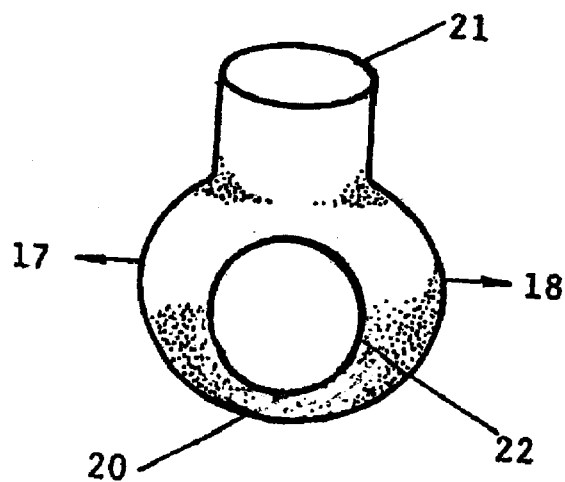
F I G . 4

BEND CONDUIT HAVING LOW PRESSURE LOSS COEFFICIENT

The design of this invention relates to the shape of a bend conduit for which its function is to eliminate pressure loss in a pipeline system caused by fluid turbulence, centrifugal force, and the boundary layer between the fluid and conduit.

BACKGROUND OF THE INVENTION

A conventional bend conduit 3, as shown in FIG. 1, normally has a relatively large pressure loss when used with straight pipes 4, 5 and 6. The invention discussed forms a pipeline system, of which the fluid dynamic properties obey the following formula:

$$H=(p1-p2)/\gamma=\lambda(L/D)(Vm*Vm/2g)+\zeta(Vm*Vm/2g),$$

Wherein
 H stands for the (measured) total pressure loss
 P1: the static pressure of the fluid at point 1 in FIG. 1
 P2: the static pressure of the fluid at point 2 in FIG. 1
 λ: the friction factor of the straight pipe
 Vm: the mean velocity calculated from orifice readings
 γ: the specific weight of the fluid
 Lu: the distance between the upstream measured tap (point 1) and the entrance of the first bend conduit
 Lm: the distance between the exit of the first bend conduit and the entrance of the second bend conduit
 Ld: the distances between the exit of the second bend conduit and the downstream measured tap (point 2)
 L: Lu+Lm+Ld
 g: the acceleration of gravity
 ζ: total pressure loss coefficient due to two bend conduits in FIG. 1
 d: the diameter of the straight pipe It is thus known that the total pressure loss (H) will be reduced if the total pressure loss coefficient(ζ) is smaller. In a pipeline system having two elbows, the value of pressure loss coefficient of the second elbow will be twice that of first elbow if the distance (Lm) is too short or two elbows are in a different plane (see FIG. 1). If a pumped fluid passes through the first elbow, as shown in FIG. 1, a strong spiral motion is produced before entering the second elbow, which results in an additional pressure loss. The pressure loss occurs because the fluid cannot travel enough length to eliminate the spiral motion and recover to its normal velocity distribution. An analysis of a fluid flowing through bend conduits will be made hereinafter by means of principles of fluid dynamics. Upon a fluid flowing through a conventional bend conduit, as shown in FIG. 2, the fluid passes from the straight pipe section to the inner 7 and outer 8 curved portion and to the adjacent straight pipe. The passage has a high pressure vortex zone 9 and low pressure eddy zones 10, 11 wherein the former will increase the resistance of friction along the fluid flow and the latter will induce a relatively large turbulent flow. This decreases the mean fluid velocity (Vm) and in turn increases the pipe cross sectional local velocity, or the pressure variations, thereby increasing the value of the pressure loss coefficient. The resistance of friction includes the inertial forces, caused by the centrifugal forces directed from the center of curvature acting at the vortex area 12, and the frictional shear force resulting from the boundary layer acting at the boundary area 13. In order to reduce the inertia forces caused by the centrifugal forces, it is proposed to decrease the acceleration of centrifugal force (V*V/R) (V stands for angular velocity) by increasing the radius of curvature (R) of the bend conduit. Prior arts are in the Bennett, U.S. Pat. No. 298,059. Bennett's bend conduit discloses forming an elbow conduit in such a way as to achieve an area of the inlet and outlet ends which join the main pipe to reduce the effects of friction and obstruction on the fluid thereby requiring less power to move the fluid. However, the Bennett patent is based on the area of the bend of intermediate section being twice the area of the first and second ends. Applicant's application is to increase the intermediate section by cutting off the corner of the inner portion and outwardly expanding the outer portion to a ball-like shape, and the area of the intermediate section is larger than the first end only. The second end may be either more or less than the area of the first end. The reason is very clear: wherein the intermediate section is enlarged by cutting off the edge of the inner corner and outwardly expanding the outer portion as a ball-like shape to provide the bend conduit with a low pressure loss coefficient whether the second end is large or small. Shaefer, U.S. Pat. No. 4,514,244, which is the same as Bennett, requires that opposite ends be of the same area size.

SUMMARY OF THE INVENTION

The objective of this invention is to provide a bend conduit design resulting in a low pressure loss coefficient The further objective of this invention is to decrease the desired pump power needed to drive a fluid through bend conduits resulting in saving energy. In addition, the objective of the present invention is to provide many band conduits with lower pressure loss coefficient in which the spiral motion within the first and adjacent second bend conduit will be greatly reduced. Then a pipeline system of many bend conduits is to decrease total pressure loss. The present invention is based on the above analysis and by means of the following measures: 1) In order to reduce the pipe cross sectional local velocity variation caused by the turbulent flow or to reduce the turning pressure loss, the low pressure eddy zone 10 of a conventional conduits in FIG. 2 needs to be as small as possible. This can be done by cutting off edge 14 to increase the radius of curvature of inner curved portion 7 wherein the angle of the incidence(α) is between 40° to 50° with reference to the direction of inlet of the flow as in FIG. 3, preferably 45°. 2) In order to reduce the acceleration of centrifugal force (V*V/R) in the bend conduit to decrease the resistance of friction acting at vortex area 12, another method is to enlarge the cross section of the turning portion by outwardly expanding the outer curved portion 16 to be a ball-like shape as in FIG. 3 and/or expanding the opposite sides 17,18 to be a ball-like shape as in FIG. 4, then increasing the cross sectional area and decreasing the angular velocity (V). This will help to eliminate the low pressure eddy zone 11; 3) In order to reduce the pressure gradient caused by the boundary layer or to minimize the frictional shear force at the boundary area 13, the best way is to expand the intermediate area from the bend conduit inlet to the middle of the intermediate section. Furthermore, in order to minimize the drag force caused by the frictional shear force, the streamlined design will achieve a more uniform velocity variation. The cross sectional area ratio between the middle of the intermediate section and the bend conduit inlet section is 1.2 to 2.0, or even more than 2.0. The present invention can effectively achieve the objective in that it is contrived after having fully and carefully considered and studied factors possibly influencing the pressure loss coefficient. The conventional elbow has a pressure loss coefficient of 0.8–1.4; the value can be reduced to smaller than 20% according to the present invention. The present invention may best be understood through the following description with reference to the accompanying drawings.

BRIEF DESCRIPTION OF THE DRAWING

FIG. 3 is a perspective view showing a preferred embodiment of a bend conduit according to the present invention.

FIG. 4 is another perspective view showing the bend conduit in FIG. 3.

DETAILED DESCRIPTION OF THE INVENTION

Figure 1:
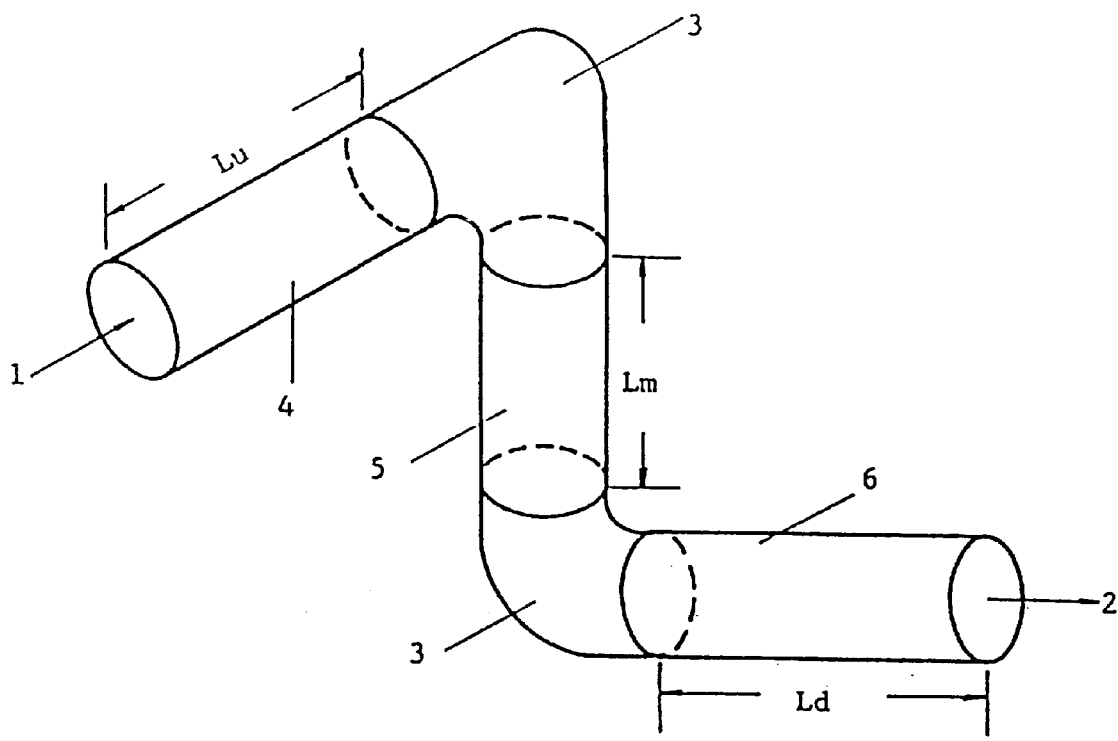
FIG. 1 is a schematic view showing a pipeline system using two bend conduits according to the prior art.
Figure 2:
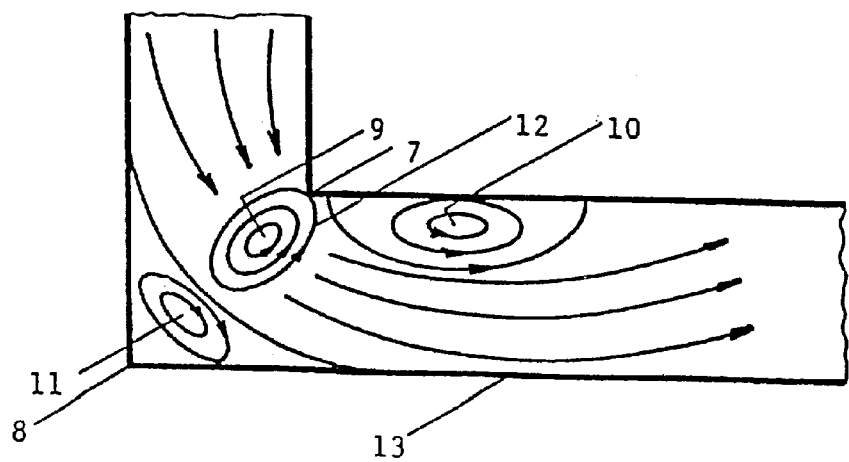
FIG. 2 is a schematic view analyzing the flow field in the bend conduit in FIG. 1.
Figure 5:
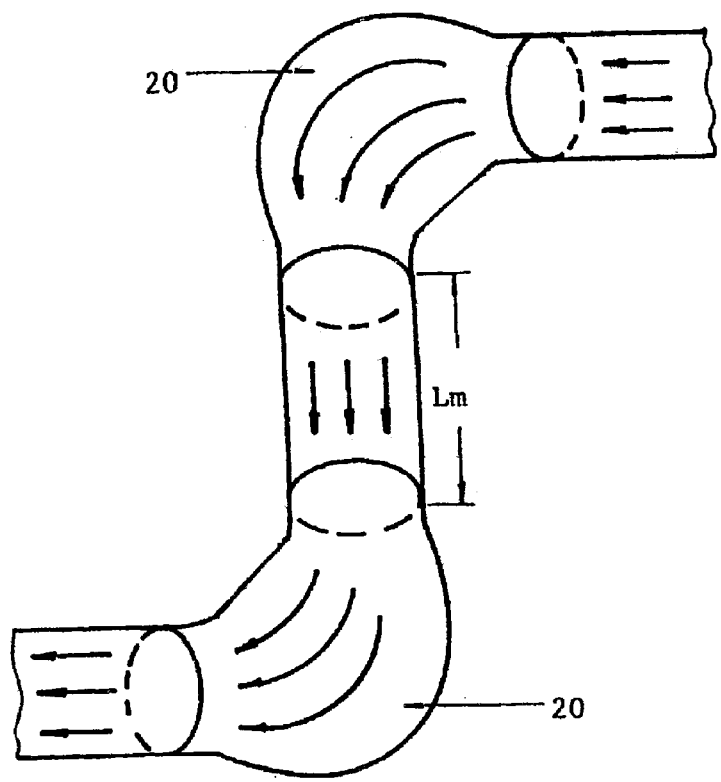
FIG. 5 is a schematic view showing a pipeline system incorporating then two bend conduits in FIG. 3.
Figure 6:
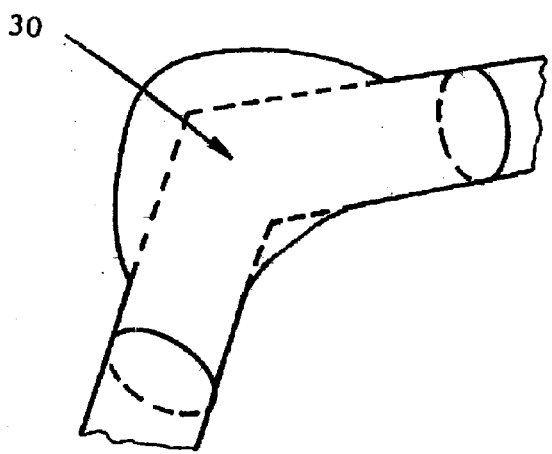
FIG. 6 is a schematic view showing a further bend conduit according to the present invention.
Figure 7:
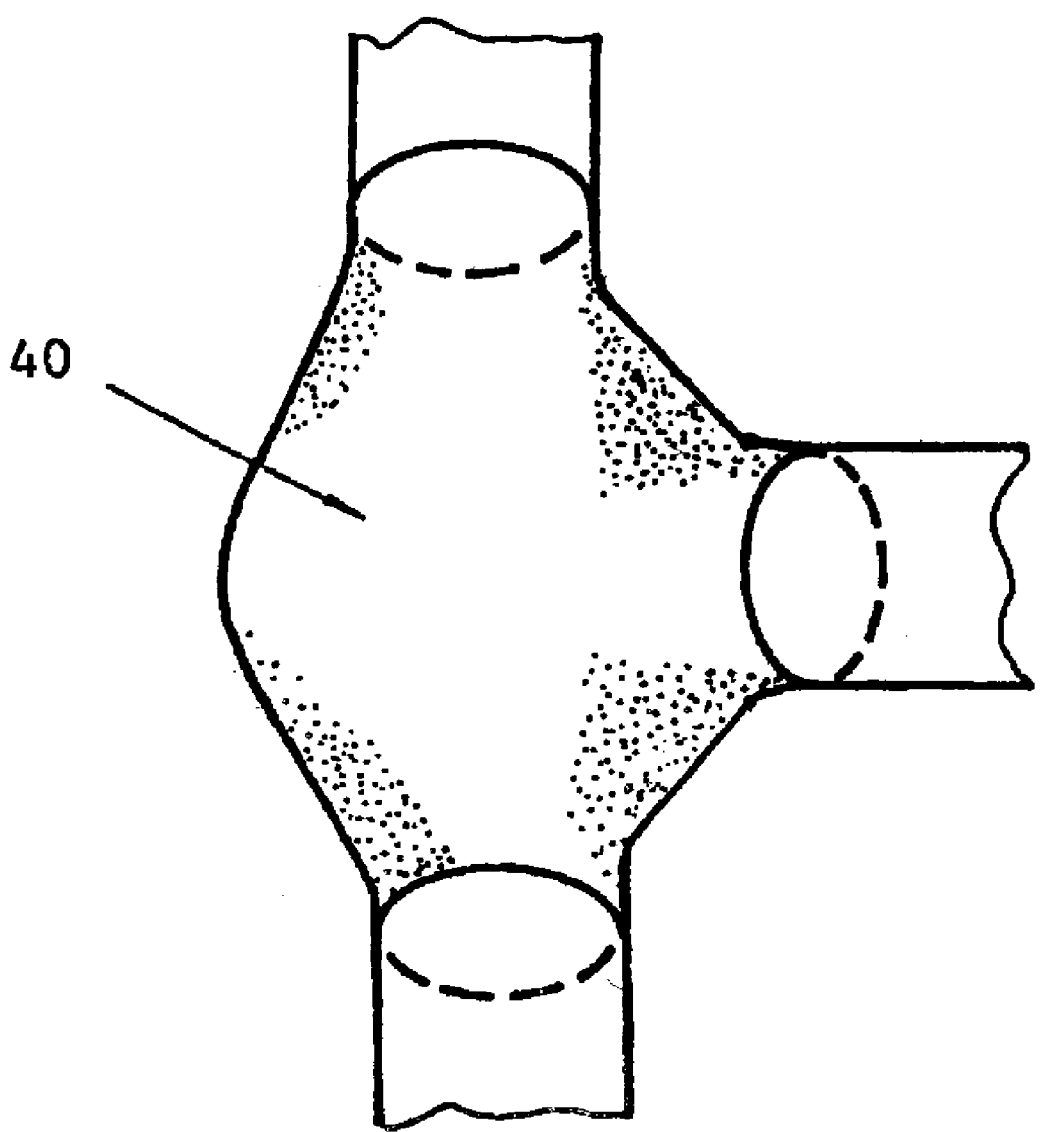
FIG. 7 is a schematic view showing an additional bend conduit according to the present invention.

Referring now to FIGS. 3 & 4, a bend conduit 20 according to the present invention includes an inlet section 21, an outlet section 22 and an intermediate section 23 having a bulbous configuration. Intermediate section 23 is enlarged by non-parallel wall surfaces which comprises the wall surface of inner curved portion 15 through cutting off edge 14 linearly at the incidence angle($\alpha$) of between 40 to 50 degrees with reference to the inlet of the flow, and the wall surface of the outer curved portion 16 expands radially outward from the center 24 of the bend conduit 20 to form a ball-like shape, and/or expanding the wall surface of the opposite sides 17,18 of the longitudinal plane lying in the center 24 of the bend conduit 20 to be ball-like shapes as in FIG. 4. It has been proved that such a bend conduit 20 in FIG. 5 will have a relatively small pressure loss coefficient if the cross sectional area ratio between the middle of intermediate section 23 and inlet section 21 is larger than 1.2 (ranged is 1.2 to 2.0 or more than 2.0). FIG. 5 shows a pipeline system using two bend conduits 20 according to the present invention. The pressure loss coefficient of the first bend conduit has little effect on the second bend conduit no matter how small of the distance between the exit of the first bend conduit and the entrance of the second bend conduit. FIG. 6 shows a 45-degree elbow 30 according to the present invention. FIG. 7 shows a tee 40 according to principles of the present invention. It is believed that one skilled in the art can easily make various modifications to the embodiments described above without departing from the spirit and scope of the appended claims.

What is claimed is:

1. A bend conduit for conducting fluids to achieve a low pressure loss coefficient, comprising:

a bend conduit including an inlet section having a first end and an outlet section having a second end;

an intermediate section having opposite ends joined together by non-parallel wall surfaces between said inlet section and said outlet section;

said intermediate section having an inner curved portion of a shorter curve along said intermediate section and an outer curved portion of a longer curve along said intermediate section for guiding and conducting the fluid between said first end and said second end;

said outer curved portion being expanded radially outwardly from the center of the bend conduit toward said longer curve;

the cross section of said intermediate section being enlarged at said longer curve;

said inner curved portion being expanded radially outwardly from the center of the bend conduit toward said shorter curve;

the edge of said shorter curve being cut off thereof to increase the radius of curvature of said inner curved portion;

said wall surface of said outer curved portion being a ball like-shape;

said wall surface of said inner curved portion being linear;

thereby, said intermediate section having a bulbous configuration and said intermediate section includes a cross sectional area ratio between a middle zone of said intermediate section and said inlet section which is at least 1.2.

2. A bend conduit according to claim 1 wherein:

said intermediate section is expanded outwardly in two opposite directions perpendicularly displaced in a longitudial plane lying along the center of bend conduit to from a ball-like shape.

3. A bend conduit according to one of claim 1 or 2 can combine another said bend conduit to form a pipeline system.

4. A bend conduit according to one of claim 1 or 2 wherein axes of said first and second ends have an including angle of 135 or 45 degrees.

5. A bend conduit according to one of claim 1 or 2, further comprising a third end serving as an opening for fluid so that said bend conduit forms a tee configuration.

6. A bend conduit according to one of claim 1 or 2 wherein:

said intermediate section has a cross sectional area ratio between a middle zone of said intermediate section and said inlet section which is within the range of 1.2 to 2.0.

7. A bend conduit according to one of claim 1 or 2 wherein:

said wall surface of said inner curved portion being cut off at a angle of incidence between 40 to 50 degrees, with the reference to the direction of said inlet section.

* * * * *